(No Model.) 2 Sheets—Sheet 1.
G. LISPENARD.
COTTON PICKER STEM.
No. 457,744. Patented Aug. 11, 1891.
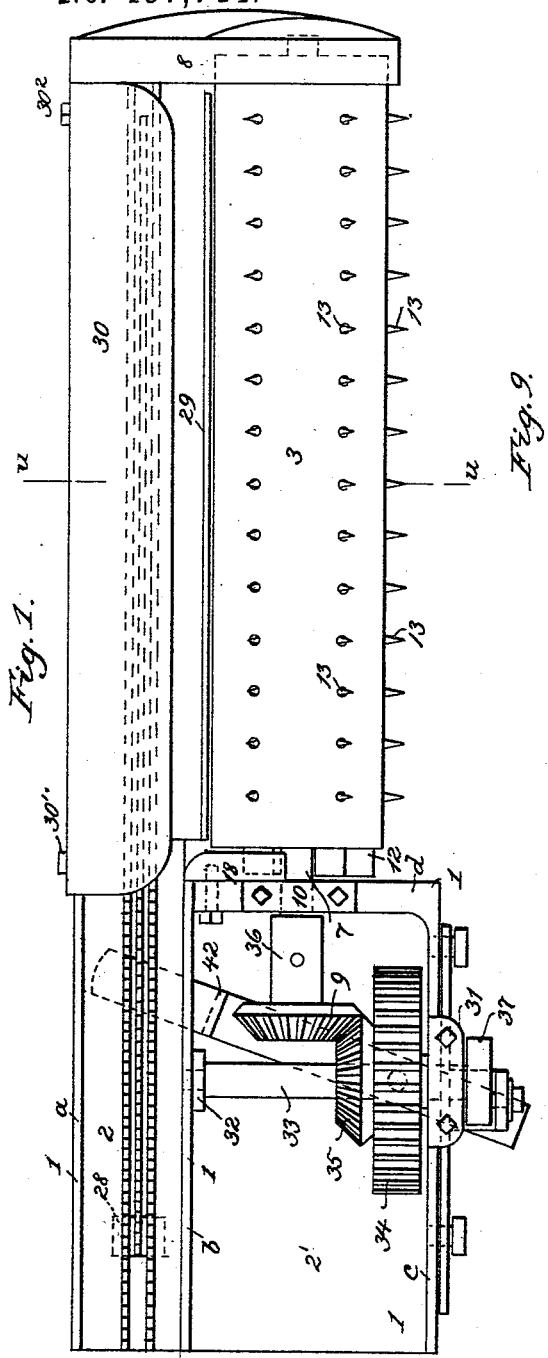
WITNESSES:
D. C. Reusch.
Jno. G. Hinkel
INVENTOR
George Lispenard
BY
Joseph G. Levy
ATTORNEY (No Model.) 2 Sheets—Sheet 2.
G. LISPENARD.
COTTON PICKER STEM.
No. 457,744. Patented Aug. 11, 1891.
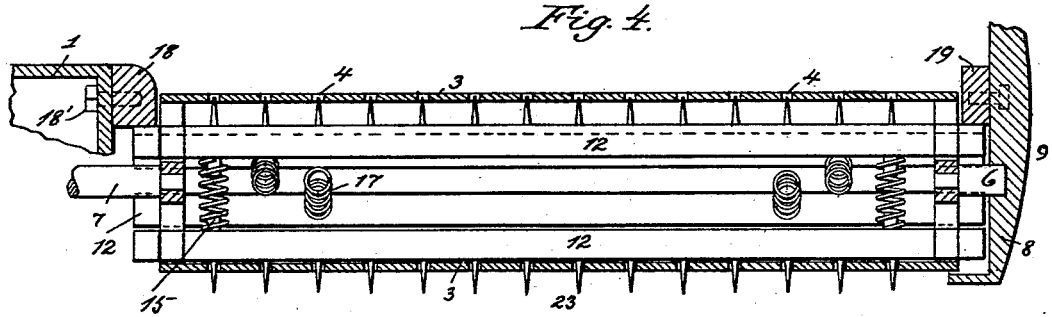
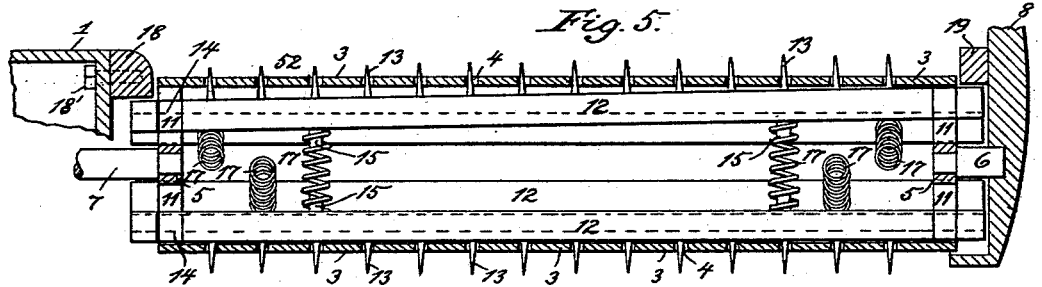
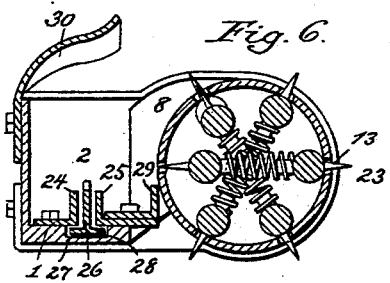
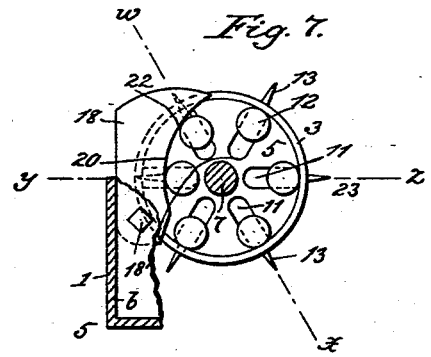
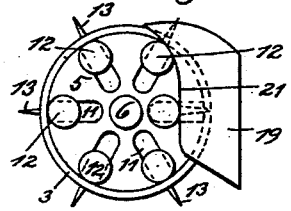
WITNESSES:
D. C. Reusch.
Jno. G. Hinkel
INVENTOR
George Lispenard
BY
Joseph G. Levy
ATTORNEY

UNITED STATES PATENT OFFICE.

GEORGE LISPENARD, OF BROOKLYN, ASSIGNOR TO SOLOMON K. LICHTENSTEIN, TRUSTEE, OF NEW YORK, N. Y.

COTTON-PICKER STEM.

SPECIFICATION forming part of Letters Patent No. 457,744, dated August 11, 1891.

Application filed November 15, 1890. Serial No. 371,505. (No model.)

*To all whom it may concern:*

Be it known that I, GEORGE LISPENARD, a citizen of the United States, residing at Brooklyn, in the county of Kings and State of New York, have invented certain new and useful Improvements in Cotton-Picker Stems, of which the following is a specification, reference being had to the accompanying drawings.

My invention relates to that part of a mechanically-operated picking device which is known in the art as the "cotton-picker stem," and which is that part that is automatically projected out by the machine into contact with the cotton-plant, which mechanism picks the cotton out of the boll. This cotton-picker stem is carried by a machine which is drawn between the rows of cotton-plants and automatically picks the ripe cotton.

Hitherto in cotton-picker stems great difficulty has been experienced in the action of the device in picking the cotton off the plant, it very often occurring that the picker will carry with it portions of the plant—such as the boll, branches, leaves, &c.—and also that in carrying the cotton to other devices by which the cotton is removed to some other part of the machine the cotton either becomes clogged in the picking mechanism or the picking mechanism throws the cotton away from it, thereby losing a great deal of the same, or the releasing of the cotton from the picking mechanism is attended with a great deal of difficulty and uncertainty. These disadvantages I propose to do away with in my device; and to that end the novelty of the same consists in the construction, combination, and arrangement of the picking devices, as will be hereinafter more fully described, and particularly pointed out in the claims.

In the drawings, Figure 1 is a plan view of the picker-stem. Fig. 2 is an end elevation. Fig. 3 is a side elevation, a portion of the picking-cylinder being broken away. Fig. 4 is a horizontal sectional view of a portion of the stem taken at about the line *w x*, Fig. 7. Fig. 5 is a like view taken on the line *y z*, Fig. 7. Fig. 6 is a transverse cross-section taken on the line *u v*, Fig. 1. Fig. 7 is an end elevation of the rear end of the picker-cylinder, showing the relation of the cam-blocks to the cylinder; Fig. 8, a like view of the forward end. Fig. 9 is a side elevation of the rear end of the oscillating conveyer-saw, showing its manner of connection with the means for oscillating it.

The frame 1, in which the picking and conveying devices hereinafter to be described are located, consists of the longitudinal trough-like portion 2, running its entire length, a box-like portion 2', located below the trough 2, both of which have upwardly-extending walls *a b c d*, and a head 8, which may be either rigidly or adjustably secured to the end of the body of the frame.

First. The essential portions of the picker-stem comprise an outer cylinder 3, which cylinder is provided with a series of holes 4. This cylinder is provided with heads 5, securely fastened to the cylinder 3, preferably at the ends thereof. The heads are provided with spindle ends 6 and 7, the spindle 6 having suitable bearings in the head 8 of the frame 1, while the spindle 7 is extended to the rear of the device, said spindle having bearings on the frame 1 at 10. The heads 5 are provided with a series of radially-extending slots 11. The foregoing is what I shall hereinafter term the "outer cylinder."

Secondly. A series of longitudinally-disposed bars 12, located within the outer cylinder and having secured thereto hackle-pins 13, which are so located as to align with the holes 4 in the outer cylinder and which are adapted to be projected out from and withdrawn into the surface of said cylinder. These bars 12 are squared at both ends, as at 14, Figs. 4 and 5, to permit said bars to play within the radial grooves 11 and to be retained therein with the hackle-pins extending, preferably, radially therefrom. The bars 12 are provided at any convenient place with studs 15, extending, preferably, radially therefrom, and to these studs are affixed spiral springs 17, the function of which is to normally force the bars 12 against the inner periphery of the outer cylinder 3, thereby projecting out the hackle-pins. The heads 5 are removably secured within the outer cylinder 3, and the radial grooves 11 extend to the periphery of said heads, so that when the device is being assembled the rods 12 can be placed in position in the heads, secured or bunched together at their ends, and inserted within the outer cylinder, the hackle-pins being caused to align with the perforations in the outer cylinder. The fastenings then being freed, the bars can spring apart and assume their proper positions in the outer cylinder, the hackle-pins projecting from the same; but the bars and heads may be modified to accommodate the assembling of the parts.

As before stated, it is very important that as many of the picking instrumentalities be presented to the cotton to be picked as may be done at one time, and also, in order to insure the disengagement of the cotton from the picking instrumentalities and so freeing it from them that it can be removed from out of the plane of their rotation as expeditiously as possible, it is herein provided in this particular case that but two of the series of bars, with their accompanying hackle-pins, shall have an inward motion at the same time, while all the others are projecting to their fullest extent from out of the outer cylinder in order to engage with the cotton.

For the purpose of projecting the bars inwardly, and thereby withdrawing the hackle-pins within the outer periphery of the outer cylinder, I provide two blocks 18 and 19, the block 18 being secured to the frame 1 and the block 19 being secured to the head 8 of the frame 1. The blocks 18 19, having cam-surfaces 20 21, will hereinafter be called "cam-blocks." The cam-blocks 18 and 19 are adjustably secured to the frame 1 in any desired manner, means being provided for that purpose, as shown at 18' and 19', Figs. 4, 5, and 7. If it is desired that the time and amount of inward projection of the bars and pins be changed, it will only be necessary to loosen the nuts 18' and 19', move the outer ends of the cam-blocks 18 and 19 to or from the bars, and when the cams are suitably located set them up by turning the nuts, the amount of inward extension of the cams regulating the amount of inward projection of the bars. Where the word "adjustability" is used in the claims it refers to this function of the cam-blocks, as before set forth. The cam-block 18 has a portion of its cam-surface, as at 22, Fig. 7, extending nearer to the axis of the spindle 7 than a corresponding portion of the cam 19, Fig. 8. As seen in these two figures, this cam-surface is so arranged that two of the bars 12 will be moving inwardly, whereas the others will be projecting their hackle-pins out from the outer cylinder, and that bar which will be opposite the point 23, Fig. 7, will be completely projected inward, and its hackle-pins will be removed within the outer surface of the outer cylinder. This is plainly seen in Figs. 4 and 6.

The device also has means for conveying the picked cotton away from the picking instrumentalities, and in order that the cotton may be freed as much as possible from contact with the hackle-pins and also to prevent the same from clogging in the machine, the bar 12, which follows immediately after the bar which has been entirely projected inward, is caused to have one of its ends partially projected inward before the entire bar takes up that movement. This is shown in Figs. 5 and 6, where it will be seen that by reason of the enlarged portion 22 of the cam-surface 20 the end of the bar sliding upon it is projected almost entirely in before its other end commences the same movement. This frees those picking instrumentalities which are located near the block 18 from contact with the cotton, leaving a free space for the operation of the conveyer, all of which will be hereinafter more fully described.

As above described, the frame 1 is provided with a trough 2, in which I locate what I term the "conveyer." This conveyer consists of two longitudinally-disposed plates 24 25, having saw-teeth on their upper edges set in the direction in which the cotton is to be conveyed when removed from the picker. These plates are secured to the frame 1 at a suitable distance apart to permit another plate 26, also provided with teeth extending in the same direction, to be placed between them. The frame 1 at this place is grooved, as at 27, and the plates 24 25 are made to lap over this groove, so as to form a guideway wherein the T-end 28 of the plate 26 may play.

Arranged longitudinally along the full length of the outer cylinder 3, and preferably in contact therewith, is a ledge or scraper 29, suitably secured to the frame 1 of the machine. The upper surface of this scraper is located preferably at or immediately below the point of greatest retraction of the hackle-pins, so as to insure the removal of the cotton from the surface of the outer cylinder, and also to be out of the way of the pins as they are gradually projected in their revolution.

The trough part 2 of the frame 1 is provided with a deflector 30, curved so as to cover the trough and conveyers, it being higher at 30' than at $30^2$ to leave a clear space at 30'. The object of this deflector is to prevent the cotton from being thrown away from the trough and conveyer, and also to compress the same down upon the conveyers, whereby its removal from the cylinder or picking part of the device is insured. This deflector 30 may extend the full length of the conveyers and may be cylindrical in cross-section after it leaves the cylinder 3—that is, it may extend rearwardly the entire distance of the same and cover the conveyer.

The deflector 30 is secured to the wall $a$ of the frame 1 by screws, &c., that part of the said deflector at 30' being higher than the part $30^2$. This is done in order to enlarge the space over the conveyers at the point where the cotton is first freed from the hackle-pins, the line of rise on the part of the deflector being comparatively as much as the line of prior deflection on the part of the hackle-pins. This gives a gradually-increasing space for the operation of the conveying mechanism, as shown at Figs. 2 and 6.

The means for rotating the picking instrumentalities and the conveyer mechanism is as follows: Suitably secured in bearings 31 32 to the frame 1 is a transverse spindle 33, provided with a spur gear-wheel 34, which is operatively connected with the motive power of the cotton-picker, upon which the picker-stem is supported. Secured to the spur-gear 34 and fast upon the spindle 33 is a bevel gear-wheel 35, which meshes with the bevel-pinion 9 fast upon the spindle 7 and is secured thereto by means of the sleeve 36. It will plainly be seen that when the spur-gear 34 is rotated rotary motion will be transferred to the outer cylinder 3 and bars 12.

The means for reciprocating the conveying mechanism consists of a disk-crank 37 fast upon the spindle 33 and provided with a crank-arm, washer, and nut 39. Pivotally secured at 40 upon frame 1 is a bent rocker-arm 41, which is bent upwardly at 42, passing through a slot 43 in the wall of the frame 1 and engaging with the plate 26, as shown at Fig. 2, the plate 26 being provided at its lower portion with a slot 44, Fig. 9, for this purpose.

Reciprocating motion is given to the rocker-arm 41 in the following manner: I provide a slotted yoke 45, having a vertically-disposed slot 46 for engagement with the crank-arm 39 and horizontally-disposed slots 47 and 48, engaging with studs 49 50, which said slots and studs form guides for the bifurcated yoke 45. The yoke 45 is also provided with a slot 51, through which passes the end of the rocker-arm 41. If rotary motion is given to the spindle 33, the same is transferred to the disk-crank 37 and thence to the bifurcated yoke 45, reciprocating it upon the studs 49 50, thereby rocking the rocker-arm 41, which gives a reciprocating motion to the plate 26 of the conveyer. The head 8 may be adjustably secured upon the frame 1, and the cam-blocks 18 and 19 are also adjustably secured to the frame 1, so that the time of the inward and outward projections of the hackle-pins may be regulated at will.

Having described the details of the construction of my device, I will now proceed to describe its operation: Assuming that the whole device is secured to the frame of a cotton-picker machine, which is automatically projected out, bringing the picker-stems into contact with the cotton-bush, rotary motion is imparted to the spur-gear 34, and through the instrumentality of the intervening mechanism the outer cylinder, carrying with it the bars 12 and hackle-pins 3, will be rotated, and coming in contact with the open cotton-boll will pick the ripe cotton from out the same. The rotary motion of the outer cylinder and its contained picking instrumentalities continuing, the cotton will be conveyed upon the same over and upon the conveying mechanism and under the deflector 30. For clearness in description it will be assumed that but one row of hackle-pins has picked cotton and is bringing it to the conveyer. As this cotton approaches the conveying mechanism the hackle-pins upon which it rests are withdrawn inwardly, and by the time they have come into close juxtaposition with the scraper 29 they have entirely receded within the outer periphery of the outer cylinder. The hackle-pins will then have lost their hold upon the cotton, which will fall down upon the conveyer-plates 24, 25, and 26, the scraper 29 clearing the outer periphery of the cylinder, and the deflector 30 compacting the cotton down upon the conveying mechanism, as above described, the cotton will be conveyed back into the machine and will be there disposed of as desired. But one part of the conveying mechanism—namely, the plate 26—reciprocates, and the teeth on all the blades being set in the same direction the blade 26 moves the cotton along, and the teeth on the blades 24 25 resisting any tendency the cotton may have to follow the blade 26 in its rearward movement. In order to insure the absolute release of the cotton from the hackle-pins 2 the bars having them affixed thereto are caused to recede while the other bars are in a state of complete projection, that bar opposite the point 23 or the extreme outer portion of the outer cylinder being fully withdrawn inward and the bar following immediately just commencing its inward movement at one end and being almost fully projected at the other. This difference in the inward movement of the same bar is made so as to give a free space for the withdrawal of the cotton by the conveying apparatus at that part of the outer cylinder where the bar is farthest withdrawn, which bar I number 52, Fig. 5. Thus it will be seen from the foregoing that I am enabled to continuously present picking instrumentalities to the ripe cotton and to release these picking instrumentalities from the cotton without changing or interrupting such picking instrumentalities.

I furthermore provide a means whereby the cotton is freed from the picking instrumentalities and compacted upon the conveyer, thereby insuring the positive contact of the cotton with the conveying devices.

It will be obvious that many changes and modifications may be made in my present invention without departing from the spirit of the same.

Having thus described my invention, what I claim, and desire to secure by Letters Patent, is—

1. In a cotton-picker stem, the combination of an outer perforated cylinder and a series of bars having radially-projecting hackle-pins arranged concentrically within the outer cylinder, devices for conveying the picked cotton away from the field of rotation of the pins extending inwardly along the side of the outer cylinder, and means whereby the part or complete withdrawal of the said pins in one end of one of the bars is accomplished prior to those on the other end, substantially as described.

2. In a cotton-picker stem, the combination of the perforated outer cylinder, a series of bars having radially-projecting hackle-pins arranged concentrically within the said outer cylinder, the bars being located diametrically opposite each other, and springs extending radially through the axis of the outer cylinder and interposed between and alternately secured to two of the said bars, said springs being adapted to project the hackle-pins out of said cylinder, and cams for withdrawing the hackle-pins against the tension of the springs, substantially as described.

3. In a cotton-picker stem, the combination of the perforated outer cylinder, radially-slotted heads secured within said outer cylinder, spindles extending from the said heads, bearings for the spindles, and a series of bars having radially-projecting hackle-pins arranged concentrically within the said outer cylinder, the ends of which pass through and out of the said slotted heads, springs extending between the bars and adapted to force them apart, and cams arranged to act on the ends of the said bars to force them inward and compress the springs, substantially as described.

4. In a cotton-picker stem, the combination of the perforated outer cylinder, a series of bars having radially-extending hackle-pins arranged concentrically within the said outer cylinder, and cams arranged to project one portion of an individual bar inward in advance of the other portion, and devices for conveying the picked cotton away from the field of rotation of the pins extending inwardly along the side of the outer cylinder, substantially as described.

5. In a cotton-picker stem, the combination of the perforated outer cylinder, a series of bars having radially-extending hackle-pins arranged concentrically within the said outer cylinder, and cams arranged to project the hackle-pins on one or more bars wholly within the peripheral surface of the outer cylinder and project the hackle-pins on one end of one or more bars inward in advance of the other end or ends, and devices for conveying the picked cotton away from the field of rotation of the pins extending inwardly along the side of the outer cylinder, substantially as described.

6. In a cotton-picker stem, the combination of the perforated outer cylinder, a series of bars having radially-extending hackle-pins arranged concentrically within the said outer cylinder, means for projecting and withdrawing said pins, a ledge or scraper for receiving the cotton from the pins applied to the periphery of the outer cylinder in close juxtaposition thereto and within the normal plane of rotation of the pins, and devices for conveying the cotton away from the field of rotation of the said hackle-pins, substantially as described.

7. In a cotton-picker stem, the combination of the perforated outer cylinder, a series of bars having radially-extending hackle-pins arranged concentrically within the said outer cylinder, means for projecting and withdrawing the pins, devices for conveying the cotton away from the pins from the field of rotation of the said hackle-pins, and a deflector located over the conveyers and arranged to deflect the cotton down upon such devices, substantially as described.

8. In a cotton-picker stem, the combination of the perforated outer cylinder, a series of bars having radially-extending hackle-pins arranged concentrically within the said outer cylinder, means for projecting and withdrawing the pins, a ledge or scraper for receiving the cotton from the pins, devices for conveying the cotton away from the field of rotation of the said hackle-pins, and a deflector located over the conveyer arranged to deflect the cotton down upon such devices, substantially as described.

9. In a cotton-picker stem, the combination, with rotating picking instrumentalities and devices comprising reciprocating and stationary saw-blades for conveying the cotton away from the field of operation of such picking instrumentalities, of a deflector located over said saws and arranged to deflect and compress the cotton upon the said conveyer, substantially as described.

10. In a cotton-picker stem, the combination of the perforated outer cylinder, a series of bars having radially-extending hackle-pins arranged concentrically within the said outer cylinder, means for projecting and withdrawing said pins, and a ledge or scraper for receiving the cotton from the pins located substantially diametrically opposite the point of greatest projection of the hackle-pins, substantially as described.

11. In a cotton-picker stem, the combination of the perforated outer cylinder, a series of bars having radially-extending hackle-pins arranged concentrically within the said outer cylinder, means for projecting and withdrawing the said pins, a ledge or scraper for receiving the cotton from the pins, and a deflector located substantially above the said ledge, substantially as described.

12. In a cotton-picker stem, the combination of the perforated outer cylinder, a series of bars having radially-extending hackle-pins arranged concentrically within the said outer cylinder, means for projecting and withdrawing the said pins, a ledge or scraper for receiving the cotton from the pins located substantially diametrically opposite the point of greatest projection of the hackle-pins, and a deflector located above said ledge, substantially as described.

13. In a cotton-picker stem, the combination of the perforated outer cylinder, a series of bars having radially-extending hackle-pins arranged concentrically within the said outer cylinder, means for projecting and withdrawing the said pins, and a ledge or scraper for receiving the cotton from the pins applied to the periphery of the outer cylinder in close juxtaposition thereto and within the normal plane of rotation of the pins, substantially as described.

14. In a cotton-picker stem, the combination of the perforated outer cylinder, radially-slotted heads secured within said outer cylinder, spindles extending from said heads, bearings for the spindles, a series of bars having radially-projected hackle-pins arranged concentrically within the said outer cylinder, the ends of which pass through and out of the said slotted heads, springs extending between the bars and adapted to force them apart, and cams arranged to act on the ends of the said bars to force them inward and compress the springs, and devices for conveying the cotton away from the field of rotation of said hackle-pins, comprising saw-blades, one of which reciprocates past one or more stationary saw-blades, substantially as described.

15. In a cotton-picker stem, the combination of the perforated outer cylinder, a series of bars having radially-extending hackle-pins arranged concentrically within the said outer cylinder, cams and springs for projecting the said pins in and out of the outer cylinder, and a ledge or scraper for receiving the cotton from the pins located in close juxtaposition to the periphery of the outer cylinder, substantially as described.

16. In a cotton-picker stem, the combination of the perforated outer cylinder, radially-slotted heads secured within the said outer cylinder, spindles extending from the said heads, bearings for the spindles, a series of bars having radially-projecting hackle-pins arranged concentrically within the said outer cylinder, the ends of which pass through and out of the said slotted heads, springs extending between the bars and adapted to force them apart, cams arranged to act on the ends of said bars to force them inward and compress the springs, and a deflector secured a suitable distance from the plane of rotation of the said pins and having an upwardly-curved portion extending toward the field of rotation of said pins, substantially as described.

17. In a cotton-picker stem, the combination of the perforated outer cylinder, a series of bars having radially-extending hackle-pins arranged concentrically within the said outer cylinder, cams and springs for projecting the said pins into and out of the outer cylinder, and a deflector secured a suitable distance from the plane of rotation of said pins and having an upwardly-curved portion extending toward the said pins, one end of said deflector being higher than the other, substantially as described.

18. In a cotton-picker stem, the combination of the outer perforated cylinder, a series of bars having radially-extending hackle-pins arranged concentrically within the said outer cylinder, means whereby the part or complete withdrawal of the said pins on one end of one of the bars is accomplished prior to those on the other end, and a deflector secured a suitable distance from the plane of rotation of said pins, one end of which is higher than the other, the high end of said deflector being placed opposite the pins having the prior withdrawal, and devices for conveying the cotton located below the deflector, substantially as described.

19. In a cotton-picker stem, the combination, with rotating picking instrumentalities, parts of which are depressed toward their central axis prior to the other part, of means for receiving and deflecting the cotton from said picking instrumentalities having an enlarged section opposite that part of the picking instrumentalities having the prior depression, and devices for conveying the cotton located below the deflector, substantially as described.

20. In a cotton-picker stem, the combination of an outer cylinder 3, having a series of longitudinally-disposed perforations 4, heads 5, having radially-extending slots 11 and axially-extending spindles 6 and 7, said heads 5 being secured in the said cylinder 3, bars 12, located in said slots and having radially-extending hackle-pins 13, aligning with the perforations in said outer cylinder, lugs 15, and springs 17 on said bars, and cam-blocks 18 and 19, located at each end of the bars, the cam-block 18 having a portion of its cam-surface nearer the axis of the spindles than the cam-block 19, substantially as described.

21. The combination, in a cotton-picker stem, of a frame 1, having a head 8 and a trough 2, a deflector 30, secured to the frame over the trough, a ledge 29, secured to said frame below the said deflector, cam-blocks 18 and 19, secured to the said frame, with picking instrumentalities, comprising an outer cylinder 3, having a series of longitudinally-disposed perforations 4, heads 5, having radially-extending slots 11, secured in the outer cylinder, spindles 6 and 7 on said heads finding bearings in frame 1, bars 12, having radially-extending hackle-pins 13, lugs 15, and springs 17 on said bars, substantially as described.

22. In a cotton-picker stem, the combination of rotating picking instrumentalities, said instrumentalities being radially movable, with adjustably-secured cams operating upon the radially-movable picking instrumentalities, substantially as described.

23. In a cotton-picker stem, the combination of a perforated outer cylinder, a series of bars having radially-extending hackle-pins arranged concentrically within the said outer cylinder, and adjustably-secured cams arranged to operate upon said bars, substantially as described.

24. In a cotton-picker stem, the combination of the perforated outer cylinder, a series of bars having radially-extending hackle-pins arranged concentrically within the said outer cylinder, and adjustably-secured cams, a part of the surface of one of the cams extending nearer the longitudinal axis of the outer cylinder than the other, substantially as described.

25. In a cotton-picker stem, the combination of rotating picker instrumentalities and conveyers, means for conjointly operating the said rotating picker and reciprocating conveyer, comprising the spur-gear 34, mounted upon a spindle 33, having bearings in the frame 1, bevel-pinion 9, secured to the spindle 7 of the rotating picker, bevel gear-wheel 35, secured upon the spindle 33, meshing with the bevel-pinion 9, disk-crank wheel 37, secured to the shaft, having crank-arm 39, bent rocker-arm 41, pivotally secured to the frame 1, in operative contact with the conveyer-blade 26 at one end, and combined with a crank-arm 39 by means of the bifurcated yoke 45, substantially as described.

26. In a cotton-picker stem, the combination of conveying instrumentalities comprising one or more blades 24 25, having saw-teeth, reciprocating blade 26, also provided with saw-teeth, and means for reciprocating the blade 26, comprising the bent rocker-arm 41, pivotally secured, a source of power, the said bent rocker-arm being operatively connected with the source of power by means of the bifurcated yoke 45, said yoke having an upwardly-extending portion 45', with slot 46, longitudinally-extending slots 47 48, slot 51, and studs 49 50, with enlarged heads in slots 47 48, substantially as described.

27. In a cotton-picker stem, the combination, with a frame 1, having a trough 2 and box-like portion 2', said portions having upwardly-extending walls $a\ b\ c\ d$, of a spindle 33, mounted to rotate on the walls $b$ and $c$, spur-gear 34, mounted on said spindle, disk-crank 37, crank-arm 39, secured to said spindle 33, bifurcated yoke 45, having an upwardly-extending portion 45', bent portion $45^4$, longitudinally-extending portions $45^2\ 45^3$, slots 46, 47, 48, and 51, studs 49 50 on the wall $c$ of the frame engaging with the slots 47 48, crank-arm 39, engaging with the slot 46, and conveying devices located in the trough 2 and operatively connected with the bifurcated yoke 45, substantially as described.

Signed at the city, county, and State of New York this 5th day of November, 1890.

GEORGE LISPENARD.

Witnesses:
B. T. VETTERLEIN,
H. F. DURBUR.